(12) United States Patent
Epee (10) Patent No.: US 10,637,231 B2
(45) Date of Patent: Apr. 28, 2020

(54) CIRCUIT INTERRUPTER PROVIDING GROUNDED NEUTRAL PROTECTION AND METHOD OF CONTROLLING THE SAME

(71) Applicant: EATON CORPORATION, Cleveland, OH (US)

(72) Inventor: Victor Doualla Epee, Pittsburgh, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 359 days.

(21) Appl. No.: 15/827,261

(22) Filed: Nov. 30, 2017

(65) Prior Publication Data

US 2019/0165563 A1    May 30, 2019

(51) Int. Cl.
| | |
|---|---|
| *H02H 3/26* | (2006.01) |
| *H02H 1/00* | (2006.01) |
| *H01H 71/12* | (2006.01) |
| *H01H 71/24* | (2006.01) |
| *H01H 9/56* | (2006.01) |
| *H02H 3/33* | (2006.01) |
| *H01H 83/14* | (2006.01) |

(52) U.S. Cl.
CPC .............. *H02H 3/265* (2013.01); *H01H 9/56* (2013.01); *H01H 71/125* (2013.01); *H01H 71/24* (2013.01); *H01H 83/144* (2013.01); *H02H 1/0007* (2013.01); *H02H 3/331* (2013.01)

(58) Field of Classification Search
USPC .......................................................... 361/42
See application file for complete search history.

(56) References Cited

U.S. PATENT DOCUMENTS

| 8,929,037 B2 | 1/2015 | Miller |
| 2007/0165342 A1* | 7/2007 | Elms ........................ H02H 3/05 |
| | | 361/42 |

* cited by examiner

*Primary Examiner* — Danny Nguyen
(74) *Attorney, Agent, or Firm* — Eckert Seamans Cherin & Mellott, LLC (57) ABSTRACT

A circuit interrupter including a first electrical conductor, a second electrical conductor, separable contacts, an operating mechanism configured to open and close said separable contacts, a trip circuit configured to trip open said separable contacts, a ground fault detection circuit configured to sense a difference between a current through the first electrical conductor and a current through the second electrical conductor and to output an output signal based on said sensed difference, a power supply, a confirmation circuit structured to input a confirmation signal to the power supply, and a processor configured to receive said direct current power and said output signal. The processor is configured to determine whether a characteristic of said confirmation signal is present in said output signal and to control the trip circuit based on said determination.

20 Claims, 4 Drawing Sheets

CIRCUIT INTERRUPTER PROVIDING GROUNDED NEUTRAL PROTECTION AND METHOD OF CONTROLLING THE SAME

BACKGROUND

Field

The disclosed concept relates generally to circuit interrupters and, more particularly, to circuit interrupters providing grounded neutral protection. The disclosed concept also pertains to methods of controlling circuit interrupters providing grounded neutral protection.

Background Information

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Circuit breakers typically include separable contacts. The separable contacts may be operated either manually by way of a handle disposed on the outside of a case or automatically in response to a detected fault condition. Typically, such circuit breakers include an operating mechanism, which is designed to rapidly open and close the separable contacts, and a trip mechanism, such as a trip unit, which senses a number of fault conditions to trip the breaker automatically. Upon sensing a fault condition, the trip unit trips the operating mechanism to a trip state, which moves the separable contacts to their open position.

One type of fault condition is a grounded neutral condition. UL943 specifies that a circuit interrupter should trip when the impedance between neutral and ground downstream of the circuit interrupter is 2 ohms or less. UL943 also specifies that the circuit interrupter must be capable of causing this trip without the application of a load current. However, without the application of a load current, the ground fault current is relatively small, thus making it difficult to detect a grounded neutral condition.

U.S. Pat. No. 8,929,037, which is incorporated herein in its entirety by reference, describes a circuit interrupter that provides grounded neutral protection. The circuit interrupter described in U.S. Pat. No. 8,929,037 detects a grounded neutral condition based on detecting a characteristic of a power supply at the output of a ground fault detection circuit for a predetermined period of time.

Some types of loads can present similar types of characteristics as a power supply. The characteristic of the load being present on a protected circuit is not indicative of a grounded neutral condition. Mistaking the characteristic of a load for a characteristic of the power supply could cause the circuit interrupter to nuisance trip. A nuisance trip is a trip when a fault condition is not actually present.

There is room for improvement in circuit interrupters.

There is also room for improvement in methods of controlling circuit interrupters.

SUMMARY

These needs and others are met by embodiments of the disclosed concept in which a circuit interrupter structured to detect a grounded neutral condition by determining whether a characteristic of a confirmation signal is present in the output signal of a ground fault detection circuit.

In accordance with aspects of the disclosed concept, a circuit interrupter comprises: a first electrical conductor configured to electrically connect to a first output of a power source; a second electrical conductor configured to electrically connect to a second output of said power source or a neutral; separable contacts; an operating mechanism configured to open and close said separable contacts; a trip circuit electrically connected between the first electrical conductor and the second electrical conductor, said trip circuit including a trip actuator configured to cooperate with said operating mechanism to trip open said separable contacts; a ground fault detection circuit configured to sense a difference between a current through the first electrical conductor and a current through the second electrical conductor and to output an output signal based on said sensed difference; a power supply electrically connected between the first and second electrical conductors, said power supply being configured to convert alternating current power from the first and second electrical conductors to a direct current power; a confirmation circuit structured to input a confirmation signal to the power supply; and a processor configured to receive said direct current power and said output signal, wherein the processor is configured to determine whether a characteristic of said confirmation signal is present in said output signal and to control the trip circuit based on said determination.

In accordance with other aspects of the disclosed concept, a method of controls a circuit interrupter. The circuit interrupter comprises separable contacts, a trip circuit configured to control tripping of said separable contacts, a power supply configured to convert alternating current power received by the circuit interrupter to a direct current power, a ground fault detection circuit configured to sense a ground fault current in the circuit interrupter and to output an output signal based on said sensed ground fault current, and a confirmation circuit structured to input a confirmation signal to the power supply. The method comprises inputting the confirmation signal to the power supply; determining, by a processor, whether the characteristic of the confirmation signal is present in the output signal; and controlling the trip circuit based on said determination of whether the characteristic of the confirmation signal is present in the output signal.

In accordance with other aspects of the disclosed concept, a non-transitory computer readable medium stores one or more programs, including instructions, which when executed by a computer, causes the computer to perform a method of controlling a circuit interrupter. The circuit interrupter comprises separable contacts, a trip circuit configured to control tripping of said separable contacts, a power supply configured to convert alternating current power received by the circuit interrupter to a direct current power, a ground fault detection circuit configured to sense a ground fault current in the circuit interrupter and to output an output signal based on said sensed ground fault current, and a confirmation circuit structured to input a confirmation signal to the power supply. The method comprises inputting the confirmation signal to the power supply; determining, by a processor, whether the characteristic of the confirmation signal is present in the output signal; and controlling the trip circuit based on said determination of whether the characteristic of the confirmation signal is present in the output signal.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "processor" shall mean a programmable analog and/or digital device that can store, retrieve and process data; a controller; a control circuit; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "electrical conductor" shall mean a wire (e.g., without limitation, solid; stranded; insulated; non-insulated), a copper conductor, an aluminum conductor, a suitable metal conductor, or other suitable material or object that permits an electric current to flow easily.

As employed herein, the term "upstream portion of the circuit interrupter" and similar phrases shall mean a portion of the circuit interrupter which is electrically connected to a power source.

As employed herein, the term "downstream portion of the circuit interrupter" and similar phrases shall mean a portion of the circuit interrupter which is electrically connected to a load circuit and is opposite of the upstream portion of the circuit interrupter.

Figure 1:
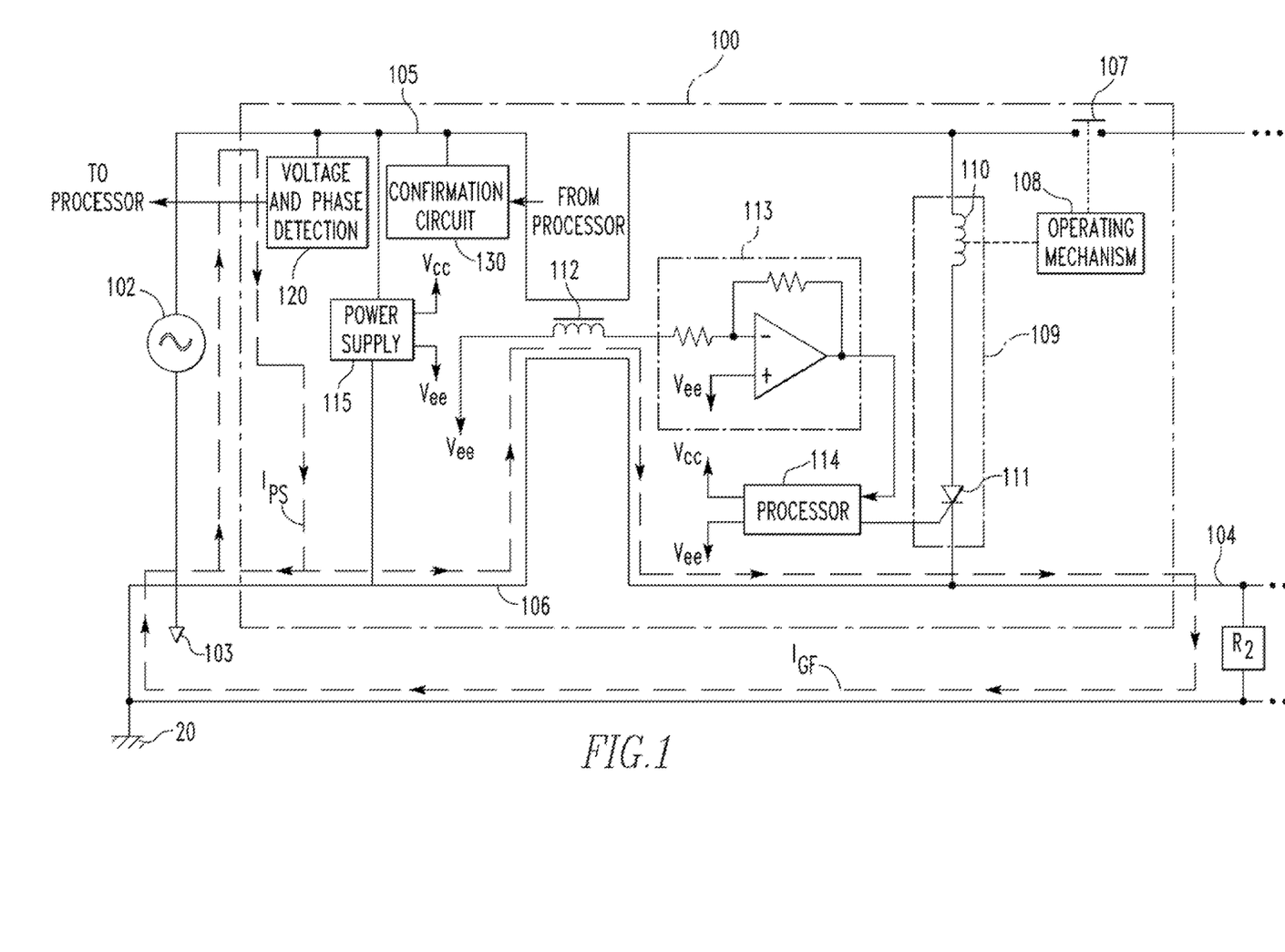
FIG. 1 is a schematic diagram of a circuit interrupter in accordance with an example embodiment of the disclosed concept.

FIG. 1 is a schematic diagram of a circuit interrupter 100 in accordance with an example embodiment of the disclosed concept. The circuit interrupter 100 is electrically connected to a power source 102, a neutral 103, and a ground 20 on its upstream portion (e.g., without limitation, side). The circuit interrupter 100 includes first and second electrical conductors 105,106 electrically connected to outputs of the power source 102. It will be appreciated that the second electrical conductor 106 can be electrically connected to a neutral 103 or both the output of the power source 102 and the neutral 103 without departing from the scope of the disclosed concept. Additionally, the power source 102 and/or neutral 103 is electrically connected to ground 20 upstream of the circuit interrupter 100. The impedance between the load neutral 104 and ground 20 on the downstream portion of the circuit interrupter 100 is represented by $R_2$. The circuit interrupter 100 also includes separable contacts 107 as well as an operating mechanism 108 structured to trip open the separable contacts 107.

The circuit interrupter 100 further includes a trip circuit 109 which is electrically coupled between the first and second electrical conductors 105,106. The trip circuit includes a trip actuator 110 (e.g., without limitation, a solenoid) which cooperates with the operating mechanism 108 to trip open the separable contacts 107. The trip circuit 109 may also include a silicon controlled rectifier (SCR) 111 electrically connected in series with the trip actuator 108 between the first and second electrical conductors 105,106. A gate of the SCR 111 is electrically connected to a processor 114 which may output a trip signal to the gate of the SCR 111 to cause the SCR 111 to turn on and allow current to flow through the trip actuator 110, thus causing the trip actuator 110 to activate and cause the operating mechanism 108 to trip open the separable contacts 107.

The circuit interrupter 100 further includes a ground fault detection circuit which includes a ground fault sensor 112 and a ground fault amplifier circuit 113. The ground fault detection circuit senses a difference between a current through the first electrical conductor 105 and a current through the second electrical conductor 106 and outputs an output signal based on the sensed difference.

In more detail, the ground fault sensor 112 is configured to sense a difference between a current through the first electrical conductor 105 and a current through the second electrical conductor 106. The ground fault sensor 112 outputs an output current based on the sensed difference. In some example embodiments of the disclosed concept, the ground fault sensor 112 is a current transformer. However, it will be appreciated that any suitable circuit which senses the difference between the current through the first electrical conductor 105 and the current through the second electrical conductor 106 and outputs an output signal based on the sensed difference may be used without departing from the scope of the disclosed concept.

The ground fault amplifier 113 is configured to convert the output current of the ground fault sensor 112 to an output voltage and to output the output voltage as the output signal to a processor 114. The disclosed ground fault amplifier circuit 113 is an inverting amplifier having first and second resistors and an operational amplifier. However, it will be appreciated that any suitable circuit which converts the output current to an output voltage may be employed without departing from the scope of the disclosed concept.

The circuit interrupter 100 further includes a power supply 115. The power supply 115 is electrically connected between the first and second conductors 105,106 and converts alternating current power carried by the first and second conductors 105,106 to direct current power (though outputs $V_{CC}$ and $V_{ee}$). The direct current power is used to power the processor 114.

The processor 114 is structured to receive the output signal from the ground fault detection circuit, analyze the output signal, and determine whether a characteristic of the power supply 115 is present in the output signal. In more detail, the power supply 115 draws current from the first conductor 105. This current can follow two paths, a first current path $i_{PS}$ and a second current path $i_{GF}$. On the first current path $i_{PS}$, the current flows between the power source 102 and the power supply 115 through the upstream portion of the circuit interrupter 100. On the second current path $i_{GF}$, the current drawn by the power supply 115 flows out of the downstream portion of the circuit interrupter 100 to ground 20 and back into the upstream portion of the circuit interrupter 100. The presence of current on the second current path $i_{GF}$ causes an imbalance in the amount of current flowing through the first and second conductors 105,106, which will be sensed by the ground fault sensor 112.

The ratio of the amount of current that flows through the first current path $i_{PS}$ and the amount of current that flows through the second current path $i_{GF}$ is based on the ratio of the neutral to ground impedance at the upstream portion of the circuit interrupter 100 to the neutral to ground impedance $R_2$ at the downstream portion of the circuit interrupter 100. As the ratio of the neutral to ground impedance at the upstream portion of the circuit interrupter 100 to the neutral to ground impedance $R_2$ at the downstream portion of the circuit interrupter 100 decreases, the amount of current that flows through the second current path $i_{GF}$ decreases. In some example embodiments of the disclosed concept, the neutral 103 is tied to ground 20 at the upstream portion of the circuit interrupter 100. Thus, when the neutral to ground impedance $R_2$ at the downstream portion of the circuit interrupter 100 is relatively high, a negligible amount of the current will flow through the second current path $i_{GF}$. However, when the neutral to ground impedance $R_2$ at the downstream portion of the circuit interrupter 100 is relatively low (e.g., without limitation, a grounded neutral condition), the current flowing through the second current path $i_{GF}$ will increase. Determining that the current from the power supply 115 is present on the second current path $i_{GF}$ can be used as an indication that a grounded neutral condition exists.

To determine whether current from the power supply 115 is present on the second current path $i_{GF}$, the processor 114 analyzes the output signal of the ground fault detection circuit and determines whether a characteristic of the power supply 115 is present in the output signal. It will be appreciated that the characteristic of the power supply 115 can be any distinctive feature in the current drawn by the power supply 115. In some example embodiments, circuit interrupter 100 is configured such that the processor 114 is able to determine that the current from the power supply 115 is present on the second current path $i_{GF}$ when the neutral to ground impedance $R_2$ at the downstream portion of the circuit interrupter 100 is 2 ohms or less.

The circuit interrupter 100 further includes a voltage and phase detection circuit 120 and a confirmation circuit 130. The voltage and phase detection circuit 120 is electrically coupled between the first conductor 105 and the processor 114. The processor 114 is structured to use outputs of the voltage and phase detection circuit 120 to sense a voltage and a zero-crossing of power from the power source 102 flowing through the first conductor 105.

The confirmation circuit 130 is electrically connected to the first conductor 105, the power supply 115, and the processor 114. The confirmation circuit 130 is structured to input a confirmation signal to the power supply 115. The confirmation signal may have a waveform having characteristics of its own. In the case of the grounded neutral condition, the confirmation signal will pass through the power supply 115 and its characteristics will be detectable in the output signal of the ground fault detection circuit. The processor 114 is structured to determine whether the characteristic of the output signal is present in the output signal of the ground fault detection circuit and to control the trip circuit 109 based on the determination.

In some example embodiments of the disclosed concept, the processor 114 is structured to control the confirmation circuit 130. For example, the confirmation circuit 130 may have an on state where it inputs the confirmation signal to the power supply 115 and an off state where it does not input the confirmation signal to the power supply 115. The processor 114 may control the confirmation circuit 130 to switch between the on and off state using, for example, a control signal. In some example embodiments of the disclosed concept, the confirmation circuit 130 may be in the off state until the processor 114 detects the characteristic of the power supply 115 in the output signal of the ground fault detection circuit. In response to detecting the characteristic of the power supply 115 in the output signal of the ground fault detection circuit, the processor 114 may control the confirmation circuit 130 to switch to the on state.

When the confirmation circuit 130 has been switched to the on state, the confirmation signal is input to the power supply 115. The processor 114 may begin detecting if the characteristic of the confirmation signal is present in the output of the ground fault detection circuit. If the processor 114 detects the characteristic of the confirmation signal is present in the output of the ground fault detection circuit, the processor 114 may control the trip circuit 109 to trip open the separable contacts 107. The presence of the characteristic of the confirmation signal is an indication that a grounded neutral condition is present.

In some example embodiments of the disclosed concept, detecting the characteristic of the power supply in the output signal of the ground fault detection circuit is not solely used to determine whether a grounded neutral condition is present and to trip open the separable contacts 107. Some types of loads may create characteristics that are similar to the characteristic of the power supply 115. Thus, the processor 114 may mistake a characteristic of a load as being the characteristic of the power supply 115. Inputting the confirmation signal to the power supply 115 and detecting whether the characteristic of the confirmation signal is present in the output of the ground fault detection circuit serves as an additional check whether the grounded neutral condition is actually present and reduces the chance of a nuisance trip.

In some example embodiments of the disclosed concept, the processor 114 switches the confirmation circuit 130 from the off state to the on state when the characteristic of the power supply 115 has been present in the output signal of the ground fault detection circuit for a predetermined period of time. Also, in some example embodiments of the disclosed concept, the processor 114 controls the trip circuit 109 to trip open the separable contacts 107 when the characteristic of the confirmation signal has been present in the output signal of the ground fault detection circuit for a predetermined period time. The predetermined period of time may be any suitable amount of time.

In some example embodiments of the disclosed concept, the characteristic of the power supply 115 is a repeating feature in a waveform of the output signal. For example, the characteristic of the power supply 115 may be a repeating peak in the waveform of the output signal of the ground fault detection circuit that repeats each cycle at a phase angle with respect to a zero-crossing of power from the power source 102. The characteristic of the confirmation signal may also be a repeating feature in the waveform of the output signal that repeats at a different phase angle with respect to the zero-crossing of power from the power source 102.

The processor 114 may control the phase angle where the characteristic of the confirmation signal appears by switching the confirmation circuit 130 to the on state for a brief period of time at the selected phase angle for each cycle of power from the power source 102. For example, the processor 114 may repeatedly turn on and turn off the confirmation circuit 130 for a predetermined period of cycles after detecting the characteristic of the power supply 115 in the output signal of the ground fault detection circuit. If the processor 114 detects the characteristic of the confirmation signal in the output signal of the ground fault detection circuit, the processor 114 may control the trip circuit 109 to trip open the separable contacts 107. If the processor 114 does not detect the characteristic of the confirmation signal in the output of the ground fault detection circuit during this period, the processor 114 may switch the confirmation circuit to the off state and resume normal operation. If the characteristic of the confirmation signal cannot be detected in the output signal of the ground fault detection circuit, it may be presumed that a grounded neutral condition is not present and that tripping open the separable contacts 107 is not necessary.

Figure 2:
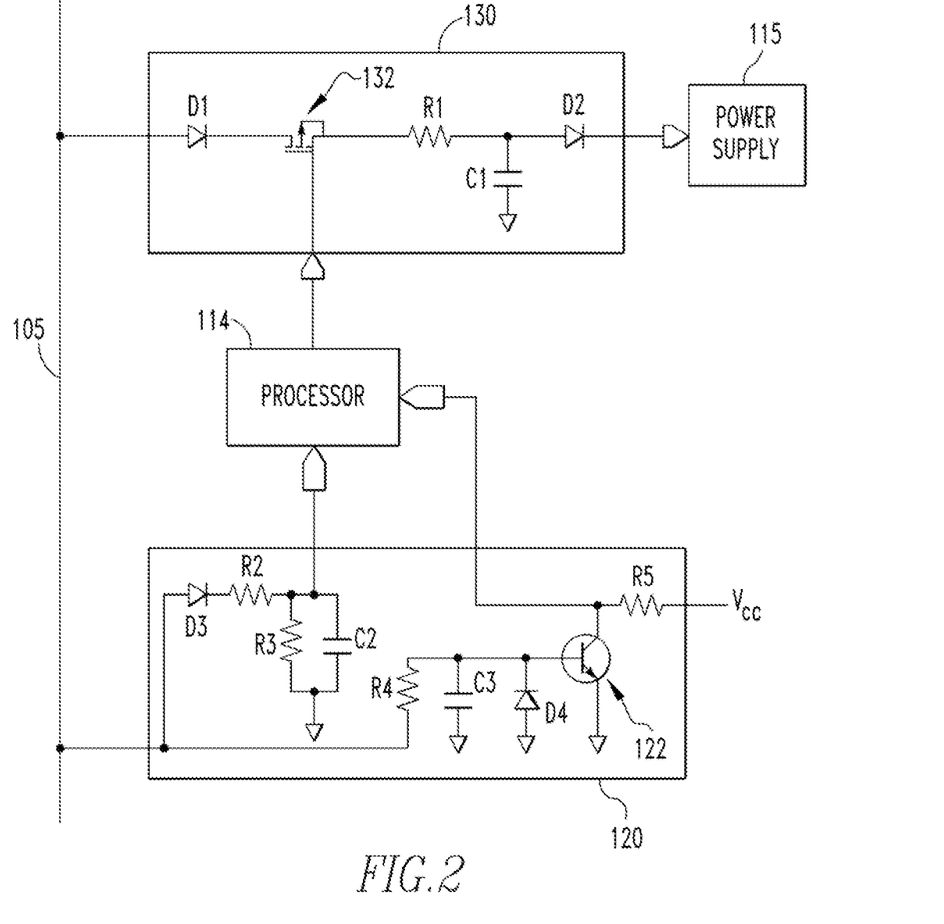
FIG. 2 is a schematic diagram of a portion of a circuit interrupter in accordance with an example embodiment of the disclosed concept.

FIG. 2 is a schematic diagram of a portion of the circuit interrupter 100 in accordance with an example embodiment of the disclosed concept. The diagram of FIG. 2 shows the voltage and phase detection circuit and the confirmation circuit 130 in more detail in accordance with an example embodiment of the disclosed concept.

The confirmation circuit 130 includes a switch 132 electrically coupled between the first conductor 105 and the power supply 115. The switch 132 is controlled by a control signal from the processor 114. The processor 114 may control the switch 132 to open and close. In some example embodiments of the disclosed concept, the switch 132 may be a transistor such as a MOSFET, BJT, or other type of transistor.

The confirmation circuit 130 also includes an RC-circuit including resistor R1 and capacitor C1 electrically coupled between the first conductor 105 and the power supply 115. When the switch 132 is closed, the capacitor C1 charges and discharges through the power supply 115. This charging and discharging creates the confirmation signal that is input to the power supply 115 and whose characteristic can be detected in the output signal of the ground fault detection circuit. The processor 114 may be structured to close the switch at a selected phase angle with respect to power from the power source 102 for a brief period of time (e.g., without limitation, 1 ms, or any other suitable period of time) which will cause the characteristic of the confirmation signal to be present at the selected phase angle in the output signal of the ground fault detection circuit if a grounded neutral condition is present. The confirmation circuit 130 also includes diodes D1 and D2 coupled between the first conductor 105 and the power supply 115.

While one example of a configuration of the confirmation circuit 130 has been shown in FIG. 2, it will be appreciated by those having ordinary skill in the art that other components and configurations of components may be employed in the confirmation circuit without departing from the scope of the disclosed concept.

The voltage and phase detection circuit 120 includes a voltage detection section and a phase detection section. The voltage detection section is electrically coupled to the first conductor 105 and includes diode D3, resistors R2 and R3, and capacitor C2 arranged as a voltage divider. The voltage detection circuit scales down voltage from the first conductor 105 for input to the processor 114. The processor 114 uses the output from the voltage detection section to detect the voltage of the power of the power source 102 flowing through the first conductor 105.

The phase detection section is also electrically connected to the first conductor 105 and includes resistors R4 and R5, capacitor C3, diode D4, and transistor 122. Resistor R4 is electrically connected between the first conductor 104 and a gate of the transistor 122 and turns the transistor 122 on and off between positive and negative half-cycles of power flowing through the first conductor 105. A square wave is produced at a collector of the transistor 122. The processor 114 uses the square wave output from the phase detection section to detect the zero-crossings of power from the power source 102.

The processor 114 may use the sensed voltage and zero-crossings of power from the power source 102 to assist with determining whether the characteristics of the power supply and/or confirmation signal are present in the output of the ground fault detection circuit. The processor 114 may also use the detected zero-crossings to assist with controlling the confirmation circuit 130 to switch between the on and off states. For example, the processor 114 may use the zero-crossings to determine the phase angle of the characteristic of the power supply 115 in the output signal of the ground fault detection circuit. The processor 114 may select a different phase angle to switch the confirmation circuit 130 to the on state and may look for the characteristic of the confirmation signal in the output of the ground fault detection circuit at the different phase angle.

While one example of a configuration of the voltage and phase detection circuit 120 has been shown in FIG. 2, it will be appreciated by those having ordinary skill in the art that other components and configurations of components may be employed in the voltage and phase detection circuit 120 without departing from the scope of the disclosed concept.

Figure 3:
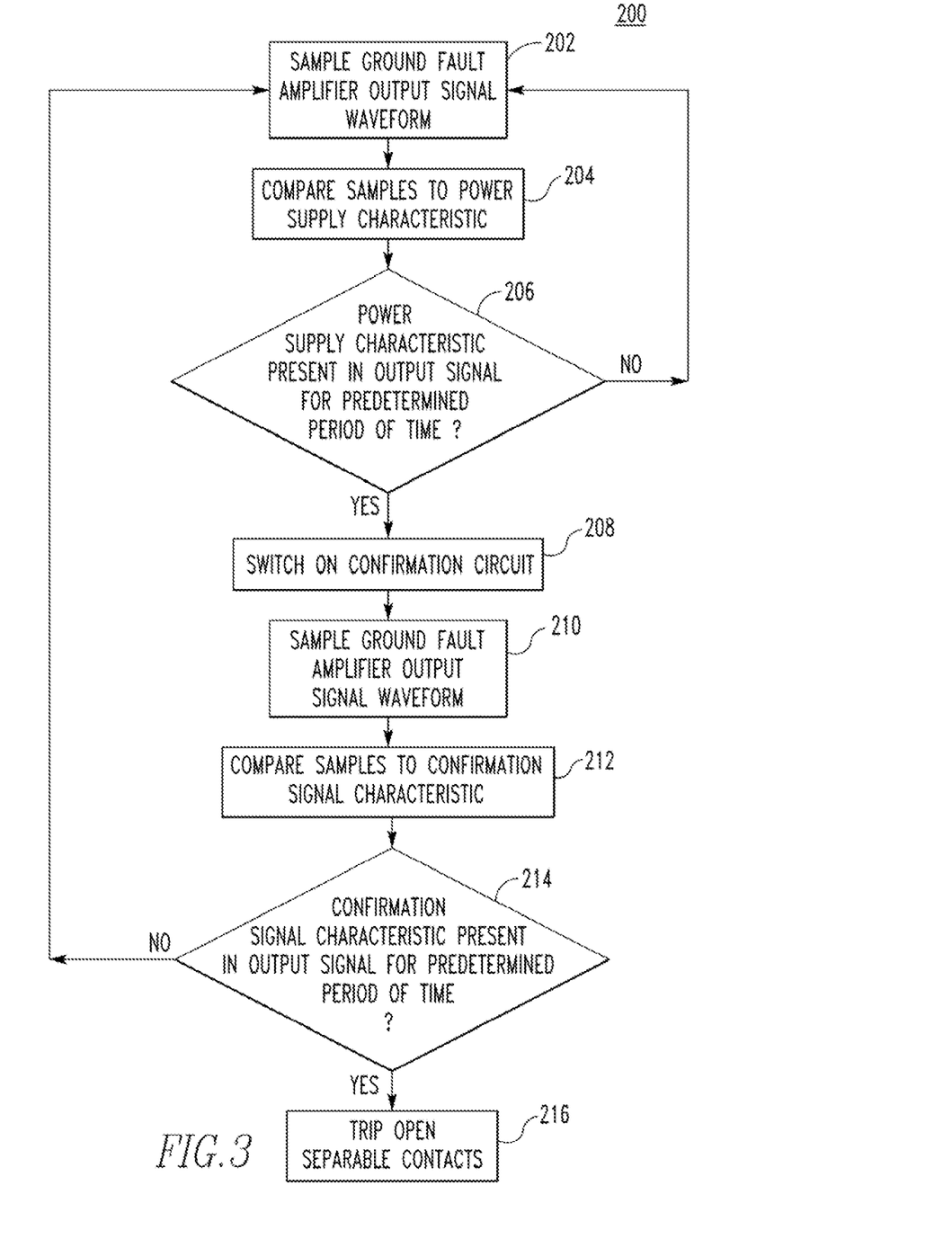
FIG. 3 is a flowchart of a method of controlling a circuit interrupter in accordance with an example embodiment of the disclosed concept.

FIG. 3 is a flowchart of a method 200 of controlling the circuit interrupter 100 in accordance with an example embodiment of the disclosed concept. The method 200 may be implemented in, for example and without limitation, the processor 114. At 202, the ground fault amplifier 113 output waveform is sampled by the processor 114. At 204, the samples are compared to an expected power supply characteristic (e.g., without limitation, repeating current peaks). The expected power supply characteristic may be stored in the processor 114 or in a suitable memory device. At 206, it is determined whether the characteristic of the power supply 115 has been present in the output signal for a predetermined period of time (e.g., without limitation, ten consecutive 60 Hz cycles, or any other suitable time period). If the characteristic of the power supply 115 has not been present in the output signal for the predetermined period of time, the method returns to 202. If the characteristic of the power supply 115 has been present in the output signal for the predetermined period of time, the method proceeds to 208.

At 208, the confirmation circuit 130 is switched on which causes the confirmation signal to be input to the power supply 115. At 210, the ground fault amplifier 113 output waveform is again sampled by the processor 114. At 212, the samples are compared to an expected confirmation signal characteristic (e.g., without limitation, repeating current peaks at a predetermined phase angle). The expected confirmation signal characteristic may be stored in the processor 114 or in a suitable memory device. At 214, it is determined whether the characteristic of the confirmation signal has been present in the output signal for a predetermined period of time (e.g., without limitation, ten consecutive 60 Hz cycles, or any other suitable time period). If the characteristic of the confirmation signal has not been present in the output signal for the predetermined period of time, the method returns to 202. If the characteristic of the confirmation signal has been present in the output signal for the predetermined period of time, the method proceeds to 216. At 216, the separable contacts 107 are controlled to trip open, for example and without limitation, by the processor 114 issuing a trip signal to the trip circuit 109.

Figure 4:
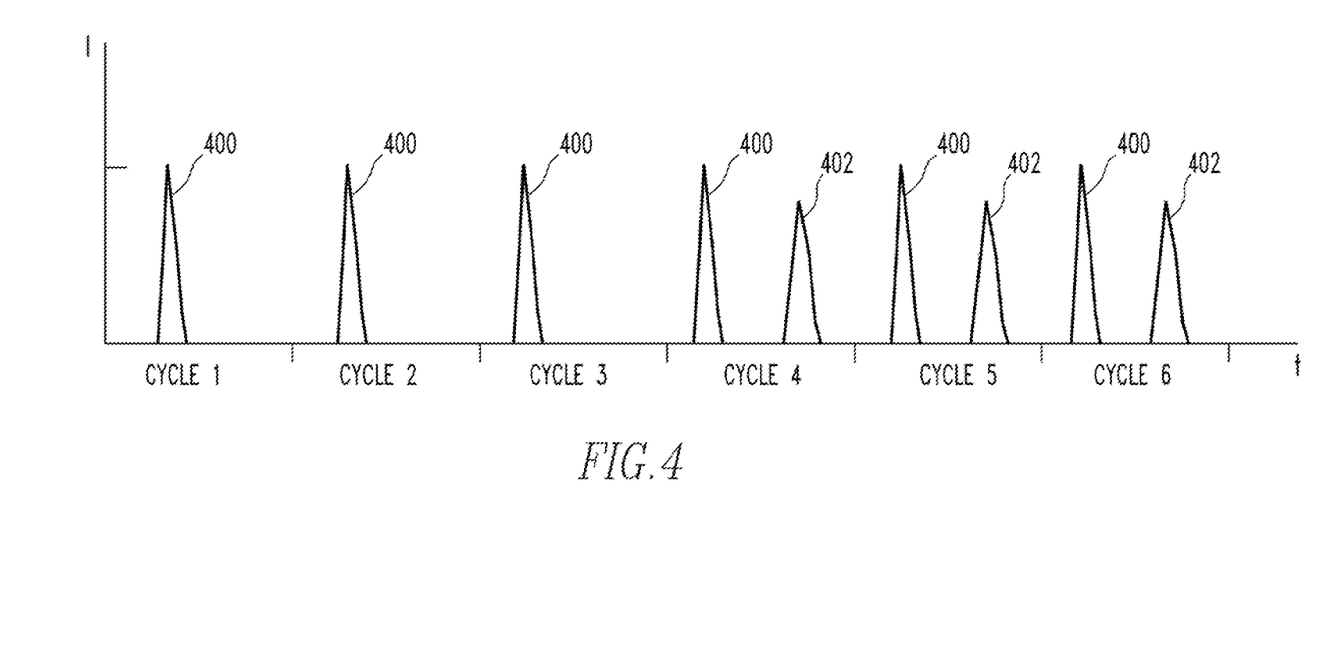
FIG. 4 is a plot of a waveform including characteristics of a power supply and a confirmation signal in accordance with an example embodiment of the disclosed concept.

FIG. 4 is a plot of an example output of the ground fault detection circuit in accordance with an example embodiment of the disclosed concept. The plot in the example shown in FIG. 4 includes characteristics of power supply 115 shown labeled as 400 and characteristics of the confirmation signal labeled as 402. In the example shown in FIG. 4, the characteristic 400 of the power supply 115 is present at a first phase angle for three cycles of power. Then, the processor 114 turns on the confirmation circuit 130 each cycle at a second phase angle, which causes the characteristic 402 of the confirmation signal to be present at the second phase angle for the next three cycles of power. In response to detecting the characteristic 402 of the confirmation signal in the output signal, the processor 114 may control the trip circuit 109 to trip open the separable contacts 107.

In the example shown in FIG. 4, a predetermined period of three cycles is used to take action in response to detection of the characteristics 400 and 402. However, it will be appreciated by those having ordinary skill in the art that any suitable period of time may be used without departing from the scope of the disclosed concept. Also, as illustrated in FIG. 4, when the characteristic 402 of the confirmation signal has a different phase angle than the characteristic 400 of the power supply 115, the characteristic 402 of the confirmation signal can be distinguished and independently detected from the characteristic 400 of the power supply 115. Also, the characteristic 402 of the confirmation signal can be placed at a predetermined phase angle and detected at the predetermined phase angle, thus preventing a characteristic of a load for being mistaken as the characteristic 400 of the confirmation signal.

It will be appreciated by those having ordinary skill in the art that the waveforms shown in FIG. 4 are for the purposes of conceptually illustrating the disclosed concept. Different characteristics 400 and 402 and a different general waveform may be employed without departing from the scope of the disclosed concept.

Although separable contacts 107 are disclosed, suitable solid state separable contacts can be employed. For example, the disclosed circuit interrupter 100 includes a suitable circuit interrupter mechanism, such as the separable contacts 107 that are opened and closed by the operating mechanism 108, although the disclosed concept is applicable to a wide range of circuit interruption mechanisms (e.g., without limitation, solid state switches like FET or IGBT devices; contactor contacts) and/or solid state based control/protection devices (e.g., without limitation, drives; soft-starters; DC/DC converters) and/or operating mechanisms (e.g., without limitation, electrical, electro-mechanical, or mechanical mechanisms).

The disclosed concept can also be embodied as computer readable codes on a tangible, non-transitory computer readable recording medium. The computer readable recording medium is any data storage device that can store data which can be thereafter read by a computer. Non-limiting examples of the computer readable recording medium include read-only memory (ROM), non-volatile random-access memory (RAM), CD-ROMs, magnetic tapes, floppy disks, disk storage devices, and optical data storage devices.

What is claimed is:

1. A circuit interrupter comprising:
a first electrical conductor configured to electrically connect to a first output of a power source;
a second electrical conductor configured to electrically connect to a second output of said power source or a neutral;
separable contacts;
an operating mechanism configured to open and close said separable contacts;
a trip circuit electrically connected between the first electrical conductor and the second electrical conductor, said trip circuit including a trip actuator configured to cooperate with said operating mechanism to trip open said separable contacts;
a ground fault detection circuit configured to sense a difference between a current through the first electrical conductor and a current through the second electrical conductor and to output an output signal based on said sensed difference;
a power supply electrically connected between the first and second electrical conductors, said power supply being configured to convert alternating current power from the first and second electrical conductors to a direct current power;
a confirmation circuit structured to input a confirmation signal to the power supply; and
a processor configured to receive said direct current power and said output signal,
wherein the processor is configured to determine whether a characteristic of said confirmation signal is present in said output signal and to control the trip circuit based on said determination.

2. The circuit interrupter of claim 1, wherein the processor is structured to determine whether a characteristic of the power supply is present in said output signal.

3. The circuit interrupter of claim 2, wherein the processor is structured to control the confirmation circuit; wherein the confirmation circuit has an on state and an off state; wherein, in the on state, the confirmation circuit inputs the confirmation signal to the power supply and, in the off state, the confirmation circuit does not input the confirmation signal to the power supply; and wherein the processor is structured to control the confirmation circuit to switch from the off state to the on state based on the determination of whether the characteristic of the power supply is present in said output signal.

4. The circuit interrupter of claim 3, wherein the processor is structured to control the trip circuit to trip open said separable contacts in response to detecting that the characteristic of the confirmation signal is present in said output signal subsequent to detecting that the characteristic of the power supply is present in said output signal.

5. The circuit interrupter of claim 3, wherein the processor is structured to control the confirmation circuit to switch from the off state to the on state when the processor determines that the characteristic of the power supply is present in said output signal for a predetermined period of time.

6. The circuit interrupter of claim 3, wherein the characteristic of the power supply is a first repeating feature in a waveform of the output signal that repeats at a first phase angle with respect to power from said power source.

7. The circuit interrupter of claim 6, wherein the characteristic of the confirmation signal is a second repeating feature in the waveform of the output signal that repeats at a second phase angle with respect to power from said power source; and wherein the first phase angle and the second phase angle are different.

8. The circuit interrupter of claim 7, wherein the processor is structured to, for a predetermined number of cycles of power from said power source after determining that the characteristic of the power supply is present in said output signal, control the confirmation circuit to switch from the off state to the on state at the predetermined phase angle and to switch from the on state to the off state after a predetermined period of time.

9. The circuit interrupter of claim 1, wherein the processor is structured to control the trip circuit to trip open said separable contacts when the processor determines that the characteristic of the confirmation circuit is present in said output signal for a predetermined period of time.

10. The circuit interrupter of claim 1, wherein the confirmation circuit is electrically connected to the first conductor and includes a switch electrically coupled between the first conductor and the power supply; and wherein the processor is structured to control the switch to open and close.

11. The circuit interrupter of claim 10, wherein the processor is structured to control the switch to close at a predetermined phase angle with respect to power from said power source and to open a predetermined period of time after closing.

12. The circuit interrupter of claim 10, wherein the confirmation circuit includes an RC-circuit electrically coupled between the first conductor and the power supply.

13. The circuit interrupter of claim 10, wherein the confirmation circuit includes a diode electrically coupled between the first conductor and the power supply.

14. The circuit interrupter of claim 1, further comprising:
a voltage detection and phase detection circuit electrically connected to the first conductor, wherein the processor is structured to use outputs of the voltage and phase detection circuit to sense a voltage and a zero-crossing of power from the power source.

15. A method of controlling a circuit interrupter comprising separable contacts, a trip circuit configured to control tripping of said separable contacts, a power supply configured to convert alternating current power received by the circuit interrupter to a direct current power, a ground fault detection circuit configured to sense a ground fault current in the circuit interrupter and to output an output signal based on said sensed ground fault current, and a confirmation circuit structured to input a confirmation signal to the power supply, the method comprising:
inputting the confirmation signal to the power supply;
determining, by a processor, whether the characteristic of the confirmation signal is present in the output signal; and
controlling the trip circuit based on said determination of whether the characteristic of the confirmation signal is present in the output signal.

16. The method of claim 15, further comprising:
determining, by the processor, wherein a characteristic of the power supply is present in the output signal.

17. The method of claim 16, inputting the confirmation signal to the power supply is performed in response to determining that the characteristic of the power supply is present in the output signal.

18. The method of claim 16, wherein the characteristic of the power supply is a first repeating feature in a waveform of the output signal that repeats at a first phase angle with respect to power received by the circuit interrupter; wherein the characteristic of the confirmation signal is a second repeating feature in the waveform of the output signal that repeats at a second phase angle with respect to power received by the circuit interrupter; and wherein the first phase angle and the second phase angle are different.

19. The method of claim 18, wherein inputting the confirmation signal to the power supply includes inputting the confirmation signal to the power supply at the second phase angle with respect to power received by the circuit interrupter.

20. A non-transitory computer readable medium storing one or more programs, including instructions, which when executed by a computer, causes the computer to perform a method of controlling a circuit interrupter comprising separable contacts, a trip circuit configured to control tripping of said separable contacts, a power supply configured to convert alternating current power received by the circuit interrupter to a direct current power, a ground fault detection circuit configured to sense a ground fault current in the circuit interrupter and to output an output signal based on said sensed ground fault current, and a confirmation circuit structured to input a confirmation signal to the power supply, the method comprising:
inputting the confirmation signal to the power supply;
determining, by a processor, whether the characteristic of the confirmation signal is present in the output signal; and
controlling the trip circuit based on said determination of whether the characteristic of the confirmation signal is present in the output signal.

* * * * *